(12) United States Patent
Shukla et al.

(10) Patent No.: US 9,990,184 B2
(45) Date of Patent: Jun. 5, 2018

(54) DISTRIBUTED COMPONENT MODEL

(75) Inventors: Dharma Shukla, Sammamish, WA (US); Akash Jeevan Sagar, Redmond, WA (US); Nathan C. Talbert, Seattle, WA (US); Muthukaruppan Annamalai, Kirkland, WA (US); Robert B. Schmidt, Carlsbad, CA (US); Aditya Bhandarkar, Sammamish, WA (US); Asad Jawahar, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 234 days.

(21) Appl. No.: 13/071,982

(22) Filed: Mar. 25, 2011

(65) Prior Publication Data

US 2012/0246613 A1    Sep. 27, 2012

(51) Int. Cl.
*G06F 9/44*    (2006.01)

(52) U.S. Cl.
CPC .................................... *G06F 8/24* (2013.01)

(58) Field of Classification Search
CPC .................. G06F 8/10; G06F 8/30; G06F 8/71
USPC ................................ 717/104, 106, 120, 121
See application file for complete search history.

(56) References Cited

U.S. PATENT DOCUMENTS

| | | | |
|---|---|---|---|
| 5,784,612 A | 7/1998 | Crane et al. | |
| 5,948,072 A | 9/1999 | Cink et al. | |
| 6,473,794 B1 | 10/2002 | Guheen et al. | |
| 6,535,975 B1 | 3/2003 | Thompson et al. | |
| 6,546,553 B1 | 4/2003 | Hunt | |
| 6,856,995 B1 | 2/2005 | Ibitayo et al. | |
| 6,907,395 B1* | 6/2005 | Hunt et al. | 703/21 |
| 7,080,143 B2 | 7/2006 | Hunt et al. | |
| 7,120,896 B2 | 10/2006 | Budhiraja et al. | |
| 7,162,509 B2 | 1/2007 | Brown et al. | |
| 7,181,731 B2 | 2/2007 | Pace et al. | |
| 7,302,634 B2 | 11/2007 | Lucovsky et al. | |
| 7,350,213 B2 | 3/2008 | Deutesfeld et al. | |
| 7,356,613 B2 | 4/2008 | Cuomo et al. | |
| 7,418,484 B2 | 8/2008 | Presley | |
| 7,448,022 B1 | 11/2008 | Ram et al. | |
| 7,451,435 B2 | 11/2008 | Hunt et al. | |
| 7,516,442 B2 | 4/2009 | Wu et al. | |
| 7,571,206 B2 | 8/2009 | Koning et al. | |
| 7,603,444 B2 | 10/2009 | Bullis | |

(Continued)

OTHER PUBLICATIONS

Thota, Chandu, "Use Web Services Provisioning to Control Access, Usage, and Billing on Your Site", Retrieved at << http://msdn.microsoft.com/en-us/magazine/cc188902.aspx >>, Dec. 2002, pp. 14.

(Continued)

*Primary Examiner* — Andy Ho
(74) *Attorney, Agent, or Firm* — Dicke, Billig & Czaja, PLLC

(57) ABSTRACT

A distributed component model for creating a scalable and available distributed application is disclosed. The distributed component model provides for an application schema to be declaratively defined to include a module having a component. The schema includes a corresponding definition construct in a technology agnostic manner. The corresponding definition construct is declaratively defined to include metadata to control scaling and availability.

20 Claims, 8 Drawing Sheets

(56) References Cited

U.S. PATENT DOCUMENTS

| | | |
|---|---|---|
| 7,730,068 B2 | 6/2010 | Sarnowicz et al. |
| 7,779,383 B2 | 8/2010 | Bornhoevd et al. |
| 7,783,763 B2 | 8/2010 | Tuel |
| 7,788,233 B1 | 8/2010 | Iyer et al. |
| 7,788,674 B1 | 8/2010 | Siegenfeld |
| 7,814,551 B2 | 10/2010 | Darweesh et al. |
| 7,937,714 B2 | 5/2011 | Grigsby et al. |
| 8,060,865 B2 | 11/2011 | Kimmerly |
| 8,116,888 B2 | 2/2012 | Tsai |
| 8,136,109 B1 | 3/2012 | Birdeau et al. |
| 9,116,724 B2 | 8/2015 | Bonnet et al. |
| 9,465,589 B2 | 10/2016 | Shukla et al. |
| 2002/0174268 A1 | 11/2002 | Goward et al. |
| 2003/0051236 A1 | 3/2003 | Pace et al. |
| 2003/0110044 A1 | 6/2003 | Nix et al. |
| 2003/0131073 A1 | 7/2003 | Lucovsky et al. |
| 2005/0021696 A1 | 1/2005 | Hunt et al. |
| 2005/0076195 A1 | 4/2005 | Fuller et al. |
| 2005/0144226 A1 | 6/2005 | Purewal |
| 2005/0262499 A1 | 11/2005 | Read |
| 2005/0289524 A1 | 12/2005 | McGinnes |
| 2006/0111880 A1 | 5/2006 | Brown et al. |
| 2006/0271341 A1 | 11/2006 | Brown et al. |
| 2007/0061779 A1* | 3/2007 | Dowedeit et al. ............ 717/120 |
| 2007/0067366 A1 | 3/2007 | Landis |
| 2007/0073829 A1 | 3/2007 | Volodarsky et al. |
| 2007/0156872 A1 | 7/2007 | Stoyanova |
| 2007/0162904 A1 | 7/2007 | Kimmerly |
| 2007/0165544 A1 | 7/2007 | Zhang |
| 2007/0203944 A1 | 8/2007 | Batra et al. |
| 2007/0226203 A1 | 9/2007 | Adya et al. |
| 2007/0233969 A1 | 10/2007 | Shukla et al. |
| 2007/0294312 A1 | 12/2007 | Seshadri et al. |
| 2008/0114829 A1 | 5/2008 | Button et al. |
| 2008/0195726 A1 | 8/2008 | Melby et al. |
| 2008/0256514 A1 | 10/2008 | Shiflet |
| 2008/0262828 A1 | 10/2008 | Och et al. |
| 2009/0007093 A1 | 1/2009 | Lin |
| 2009/0113451 A1 | 4/2009 | Grigsby et al. |
| 2009/0199213 A1 | 8/2009 | Webster et al. |
| 2009/0248693 A1 | 10/2009 | Sagar et al. |
| 2009/0249310 A1 | 10/2009 | Meijer et al. |
| 2010/0057787 A1 | 3/2010 | Gnech et al. |
| 2010/0153955 A1 | 6/2010 | Sirota et al. |
| 2010/0241252 A1 | 9/2010 | Tsai |
| 2010/0293146 A1 | 11/2010 | Bonnet et al. |
| 2010/0318975 A1 | 12/2010 | Gustafsson et al. |
| 2012/0159424 A1 | 6/2012 | Shukla et al. |
| 2012/0159425 A1 | 6/2012 | Shukla et al. |
| 2012/0222003 A1 | 8/2012 | Shukla et al. |
| 2012/0254109 A1 | 10/2012 | Shukla et al. |
| 2012/0260227 A1 | 10/2012 | Shukla et al. |

OTHER PUBLICATIONS

"Distributed Component Models", Retrieved at << http://java.sun.com/developer/Books/jdbc/ch08.pdf >>, Retrieved Date: Nov. 25, 2010, p. 146-182.

Urquhart, James, "Application packaging for cloud computing: A proposal," Retrieved at << http://news.cnet.com/8301-19413_3-10422517-240.html >>, Jan. 2, 2010, pp. 4.

Peltzer, Dwight, "IBM's WebSphere Application Server vs. Microsoft's .NET Framework," Retrieved at << http://websphere.sys-con.com/node/45007 >>, May 26, 2004, pp. 4.

Pattison, Ted, "Visual Basic .NET: New Programming Model and Language Enhancements Boost Development Power," Retrieved at << http://msdn.microsoft.com/en-us/magazine/cc302016.aspx >>, Feb. 2001, pp. 9.

The Office Action for U.S. Appl. No. 12/975,127 mailed Jul. 16, 2013 (16 pgs.)

The Final Office Action for U.S. Appl. No. 12/975,127 mailed Oct. 9, 2013 (16 pgs).

The Office Action for U.S. Appl. No. 12/975,127 mailed Jul. 30, 2014 (14 pgs).

The Final Office Action for U.S. Appl. No. 12/975,127 mailed Dec. 31, 2014 (14 pgs).

The Office Action for U.S. Appl. No. 12/975,127 mailed May 13, 2015 (16 pgs).

Bellissard, et al., "Distributed Application Configuration", Retrieved at << http://sardes.inrialpes.fr/~boyer/research/publications-web/96-Olan-ICDCS.pdf >>, Proceedings of the 16th International Conference on Distributed Computing Systems, 1996, pp. 7.

Rasche, et al., "ReDAC—Dynamic Reconfiguration of distributed component-based applications", Retrieved at << http://www.dcl.hpi.uni-potsdam.de/papers/papers/rasche_isorc08.pdf >>, Proceedings of the 11th IEEE Symposium on Object Oriented Real-Time Distributed Computing, 2008, p. 1-9.

Thalauer, Stefan, "Aspects of Interrelations in Distributed Component Systems", Retrieved at << http://www.iicm.tu-graz.ac.at/thesis/sthalauer.pdf >>, May 2004, pp. 85.

Soley, Richard, "Model-driven architecture targets middleware interoperability challenges", Retrieved at << http://www.ibm.com/developerworks/rational/library/403.html >>, Jul. 15, 2003, pp. 7.

The Office Action for U.S. Appl. No. 13/037,299 mailed Feb. 10, 2014 (16 pgs.)

The Final Office Action for U.S. Appl. No. 13/037,299 mailed May 21, 2014 (14 pgs.)

The Office Action for U.S. Appl. No. 13/037,299 mailed Aug. 27, 2014 (14 pgs.)

The Final Office Action for U.S. Appl. No. 13/037,299 mailed Jan. 2, 2015 (15 pgs.)

The Notice of Allowance for U.S. Appl. No. 13/037,299 mailed Apr. 13, 2015 (5 pgs.)

Volodarsky, Michael. "Fast, Scalable, and Secure Session State Management for Your Web Applications", Retrieved at <<http://msdn.microsoft.com/en-us/magazine/cc163730.aspx?wa=wsignin1.0>>, Sep. 2005, pp. 12.

"Physical Tiers and Deployment", Retrieved at <<http://msdn.microsoft.com/en-us/library/ee658120.aspx>>, Retrieved Date; Nov. 24, 2010, pp. 17.

Brown, Simon, "Scalability Principles", Retrieved at <<http://www.infoq.com/articles/scalability-principles>>, May 21, 2008, pp. 4.

"What is new in VMWare's vFabric GemFire 6.5?", Retrieved at <<http://jagslog.blogspot.com/2010/10/what-is-new-in-vmware-vfabric-gemfire.html>>, Oct. 7, 2010, pp. 9.

The Office Action for U.S. Appl. No. 13/080,369 mailed Jun. 10, 2013 (16 pgs.)

Microsoft Application Architecture Guide, 2nd Edition, published on Oct. 2009 (158 pgs).

Skonnard, "Building Distributed Applications with .NET Services," MSDN Magazine, Apr. 2009. 11 pgs.

Milner, Updated to release: Apr. 2010 A Developer's Introduction to Windows Workflow Foundation (WF) in .NET 4, Pluralsight Nov. 2009. 56 pgs.

The Final Office Action for U.S. Appl. No. 13/080,369 mailed Dec. 17, 2013 (14 pgs.)

The Office Action for U.S. Appl. No. 13/080,369 mailed Mar. 26, 2014 (15 pgs.)

The Final Office Action for U.S. Appl. No. 13/080,369 mailed Jul. 8, 2014 (17 pgs.)

The Office Action for U.S. Appl. No. 13/080,369 mailed Nov. 6, 2014 (15 pgs.)

Hong, et al., "Software Component Composition based on ADL and Middleware", Retrieved at<< http://pages.cs.wisc.edu/~chang/papers/SciChina01_ABC.pdf>>,vol. 44 No. 2, Apr. 2001,pp. 16.

Lagaisse, et al., "True and Transparent Distributed Composition of Aspect-Components", Retrieved at<<http://people.cs.kuleuven.be/~bert.lagaisse/papers/lagaisse.middleware06.pdf>>,2006, pp. 20.

Yau, et al., "A Component-Based Approach to Object-Oriented Distributed Application Software Development", Retrieved at<<http://ieeexplore.ieee.org/stamp/stamp.jsp?arnumber=00716662>>,pp. 6.

(56) References Cited

OTHER PUBLICATIONS

Sahai, et al., "A Data Model Based on Service and Process Abstractions for Management of Systems", Retrieved at<<http://www.hpl.hp.com/techreports/2002/HPL-2002-190.pdf>>,Jul. 9, 2002, pp. 17.
Yau, et al., "Component Customization for Object-Oriented Distributed Real-Time Software Development", Retrieved at<<http://www.computer.org/portal/web/csdl/doi/10.1109/ISORC.2000.839523>>,Mar. 2000,pp. 8.
The Office Action for U.S. Appl. No. 13/073,398 mailed Mar. 27, 2013 (29 pgs.)
The Final Office Action for U.S. Appl. No. 13/073,398 mailed Jul. 18, 2013 (31 pgs.)
The Office Action for U.S. Appl. No. 13/073,398 mailed Jun. 17, 2014 (30 pgs.)
The Final Office Action for U.S. Appl. No. 13/073,398 mailed Nov. 13, 2014 (32 pgs.)
The Office Action for U.S. Appl. No. 13/073,398 mailed Mar. 26, 2015 (32 pgs.)
IBM, "Service Component Model Based Runtime," IP.com, 2007 5 pgs.
The Notice of Allowance for U.S. Appl. No. 13/080,369 mailed Jun. 4, 2015 (18 pgs.)
The Notice of Allowance for U.S. Appl. No. 13/037,299 mailed Jul. 17, 2015 (21 pgs.)
The Final Office Action for U.S. Appl. No. 13/073,398 mailed Jul. 30, 2015 (44 pgs.)
The Office Action for U.S. Appl. No. 12/975,127 mailed Apr. 22, 2016 (18 pgs.)
The Final Office Action for U.S. Appl. No. 13/073,398 mailed Mar. 15, 2016 (41 pgs.)
The Final Office Action for U.S. Appl. No. 12/975,127 mailed Sep. 16, 2015 (34 pgs.)
The Notice of Allowability for U.S. Appl. No. 13/037,299 mailed Oct. 22, 2015 (6 pgs.)
The Notice of Allowance for U.S. Appl. No. 13/037,299 mailed Nov. 5, 2015 (13 pgs.)
From Wikipedia, the Free Encyclopedia (redirected from Platform as a Service), "Cloud Computing," pp. 1-7 (Retrieved Dec. 16, 2015) <<https://web.archive.org/web/20100228202033/http://en.wikipedia.org/wiki/Platform_as_a_service#Plafform>>.
The Notice of Allowance for U.S. Appl. No. 13/080,369 mailed Oct. 27, 2015 (5 pgs.)
The Office Action for U.S. Appl. No. 13/073,398 mailed Nov. 19, 2015 (35 pgs.)
Yau, et al., "A Component-Based Approach to Object-Oriented Distributed Application Software Development", Retrieved at<<http://ieeexplore.ieee.org/stamp/stamp.jsp?arnumber=00716662>>,pp. 6 (Aug. 19-21, 1998).
The Notice of Allowance for U.S. Appl. No. 13/080,369 mailed Feb. 12, 2016 (11 pgs.)
The Notice of Allowance for U.S. Appl. No. 13/080,369 mailed Jun. 7, 2016 (11 pgs.)
The Office Action for U.S. Appl. No. 13/037,299 mailed Jun. 30, 2016 (18 pgs.)
Final Office Action for U.S. Appl. No. 12/975,127 dated Sep. 16, 2016 (25 pgs.).
Notice of Allowance for U.S. Appl. No. 13/037,299 dated Jan. 17, 2017 (13 pgs.).
Office Action for U.S. Appl. No. 13/073,398 dated Aug. 24, 2016 (41 pgs.).
Final Office Action for U.S. Appl. No. 13/073,398 dated Feb. 15, 2017 (42 pgs).
Cohen, U., et al., "Configuring the Processing Unit SLA", GigaSpaces [online], 2010 [retrieved Feb. 12, 2017], Retrieved from Internet: <URL:http://wiki.gigaspaces.com/wiki/pages/viewpage.action?pageId=61871680>, pp. 1-10.
Office Action for U.S. Appl. No. 12/975,127 dated Jun. 16, 2017 (26 pgs).
Notice of Allowance for U.S. Appl. No. 13/037,299 dated Jun. 5, 2017 (13 pgs).
Office Action for U.S. Appl. No. 13/073,398 dated Jun. 14, 2017 (48 pgs).
Final Office Action for U.S. Appl. No. 12/975,127 dated Oct. 27, 2017 (22 pgs).
Final Office Action for U.S. Appl. No. 13/073,398 dated Oct. 13, 2017 (42 pgs).

\* cited by examiner

DISTRIBUTED COMPONENT MODEL

BACKGROUND

Distributed computing applications are often deployed into environments having a multitude of different technologies and services that are used to form building blocks of the applications. Examples of distributed applications are legion and can include enterprise applications such as line of business or LOB, billing systems, customer relationship management or CRM, enterprise resource planning or ERP, business intelligence, human resource management, manufacturing, inventory control applications, and others. Such applications include components that are typically distributed across tiers in a computer network. Also, some applications are intended to run in a cloud computing environment, others are intended to run on the premises of the entity or user, and others are intended to span these environments. Further, the environment may change as an application evolves, the number of users change, or the locations of the users become dispersed.

One desirable characteristic of a distributed application is its ability to scale, or to cost-effectively change with the enterprise. Existing program models do not aim to support the development of scalable distributed applications. Typical component models are designed for desktop applications and are tier and technology specific. A distributed application is typically comprised of a set of distinct components, spread across tiers, which interact to perform work. While the components are virtualized, the relationship between the components is not. A physical wiring of components during runtime interaction is typically statically determined or otherwise hard-coded in this framework, which can place limits on the ways in which the application can be scaled or even on the application's overall ability to scale. While working with such models, many developers try to avoid writing stateful components because they are difficult to scale, but in making this choice the developer sacrifices benefits of other approaches, such as the natural expression of application logic.

Current techniques of state portioning and replication are limited to high-end developers and are implemented by technologies of databases and distributed caches. There is no program model, however, that makes these techniques and technologies approachable and mainstream for developers to use in writing and scaling application state logic.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure is directed to a distributed component model for writing and executing both stateless and stateful components that are both scalable and highly available. The model also includes a set of cross cutting capabilities for components such as tenant-aware billing, metering, throttling, and the like. Stateless components are made scalable and available with techniques such as cloning or process replication, and stateful components are made available with techniques such as partitioning and state replication. Scalability is affected through the mainstream programming modifications to component metadata and through multiple programs models, which avoids difficult and costly re-architecture of stateful applications. Additionally, the distributed component model is extensible and technology neutral, and it can be used to expose component capabilities over standard Web protocols.

In one example, the disclosure relates to a distributed component model for creating a distributed application. The distributed component model provides for an application schema to be declaratively defined to include a module having a component. The schema includes a corresponding definition construct in a technology agnostic manner. The corresponding definition construct is declaratively defined to include metadata to control scaling and high availability.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
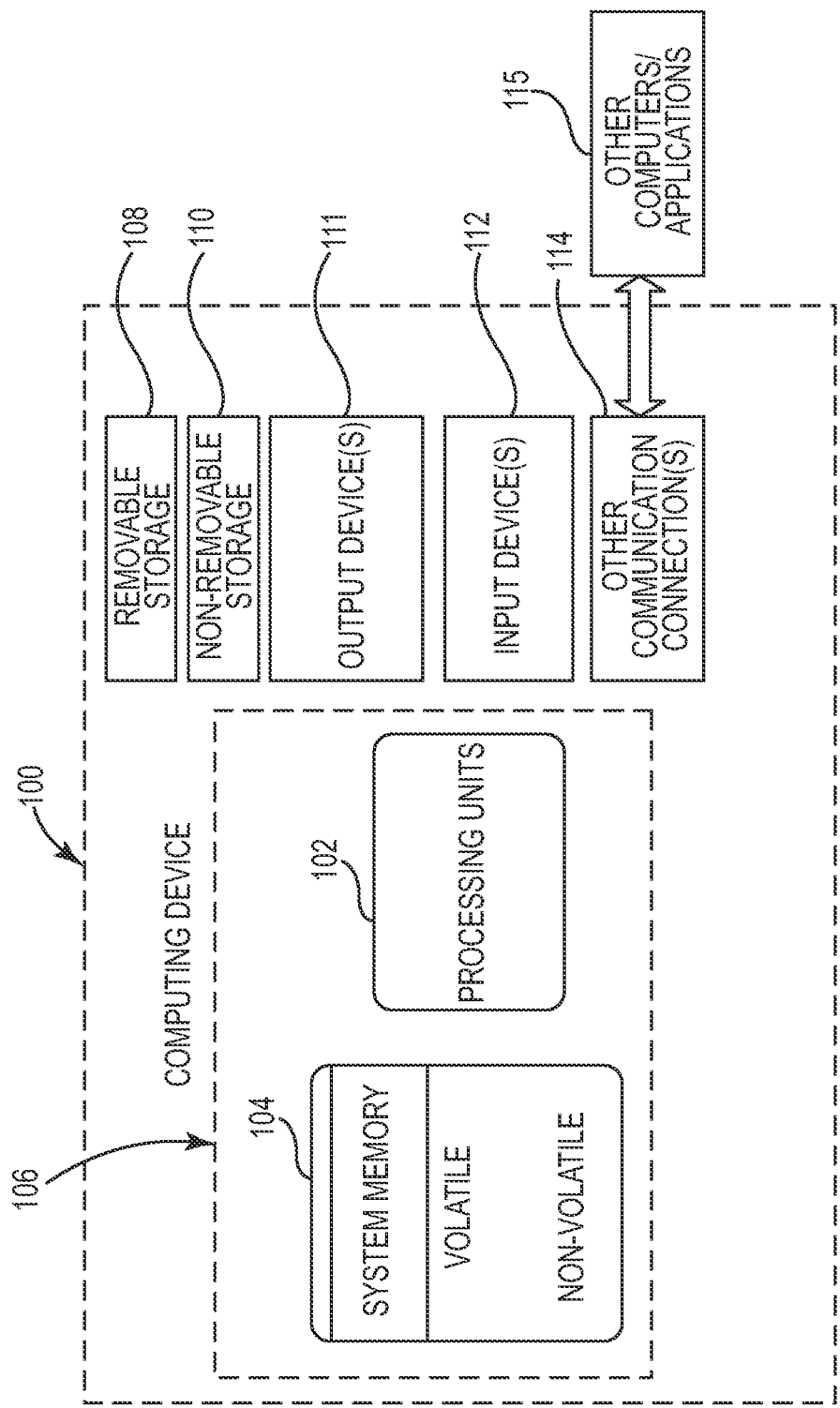
FIG. 1 is a block diagram illustrating an example computing device for running, hosting, or developing a distributed application.

FIG. 1 illustrates an exemplary computer system that can be employed in an operating environment such as a distributed computing system or other form of computer network and used to host or run a distributed application included on one or more computer readable storage mediums storing computer executable instructions for controlling a computing device or distributed computing system to perform a method. The computer system can also be used to develop the distributed application and/or provide a serialized description or visualized rendering of the application.

The exemplary computer system includes a computing device, such as computing device 100. In a basic configuration, computing device 100 typically includes a processor system having one or more processing units, i.e., processors 102, and memory 104. Depending on the configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. An example communication connection can be an Ethernet interface. In some examples, the computing device can also have one or more additional processors or specialized processors (not shown) to perform processing functions offloaded from the processor 102. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. Typically, the managed environment includes pre-coded solutions to common programming problems to aid software developers to create applications, such as software programs, to run in the managed environment. An example of a managed environment can include an application framework sold under the trade designation .NET Framework available from Microsoft, Inc. of Redmond, Wash. U.S.A.

Figure 2:
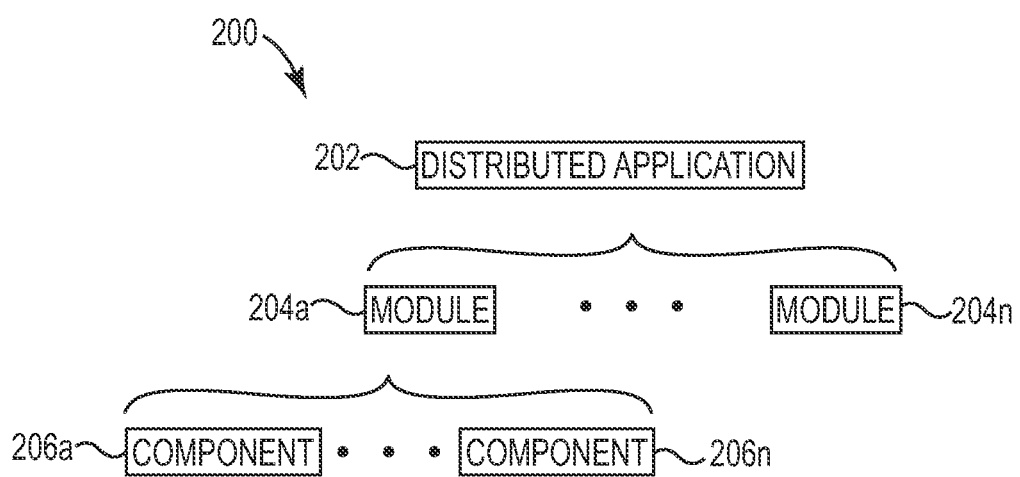
FIG. 2 is a block diagram illustrating a schema of an example distributed application according to a distributed component model.

FIG. 2 illustrates a schema 200 for a distributed application 202. The schema 200 generally describes the distributed application 202 constructed according to a distributed component model in an application framework. The distributed component model defines the schema 200 in abstractions including application, module, and component. The distributed application 202 includes one or more modules 204a-204n, and each module 204a-204n includes one or more components 206a-206n. Each component 206a-206n can specify imports and exports and includes metadata and artifacts. Application 202 is hosted in an application fabric that, in one example, provides the capabilities to deploy, run, and manage distributed applications that are long running, stateful, and allow high availability and elastic scale. At runtime (also referred to as execution time), the application framework provides the connections between the components 206a-206n of the application 202, described logically in the distributed component model.

The distributed application 202 has an identity and is a unit of deployment and management in the application fabric. When deployed, the application 202 spans tiers in the environment. Examples of tiers can include a client tier in many forms; a web tier, which is typically stateless, that can be available all of the time; a worker tier, including stateless and stateful components, that provides much of the logic of the application 202; and a storage tier that can be located on premises, in the cloud environment, or in a combination of the two. (Stateless can include abstractions that have no state or externalize state.) In one example, the application 202 is deployed to application fabric host farms. Physically, the application includes a package containing an application manifest that describes the compositional structure of the application, implementation details, configuration, and application artifacts. The application 202 in the example also corresponds to a tenant in the distributed component model and can include tenants of its own. This provides a layered and extensible tenant model that can be used for billing, throttling, metering, and the like.

Modules 204a-204n are a logical grouping of one or more components 206a-206n. For example, modules 204a-204n are each a tier-specific unit of hosting, which includes aspects of activation, scalability, availability, and isolation. Components 206a-206n in module 204a are deployed to the same host or single process and are typically co-located in the execution environment. The components 206a-206n often leverage the co-location for data affinity or the like.

Figure 3:
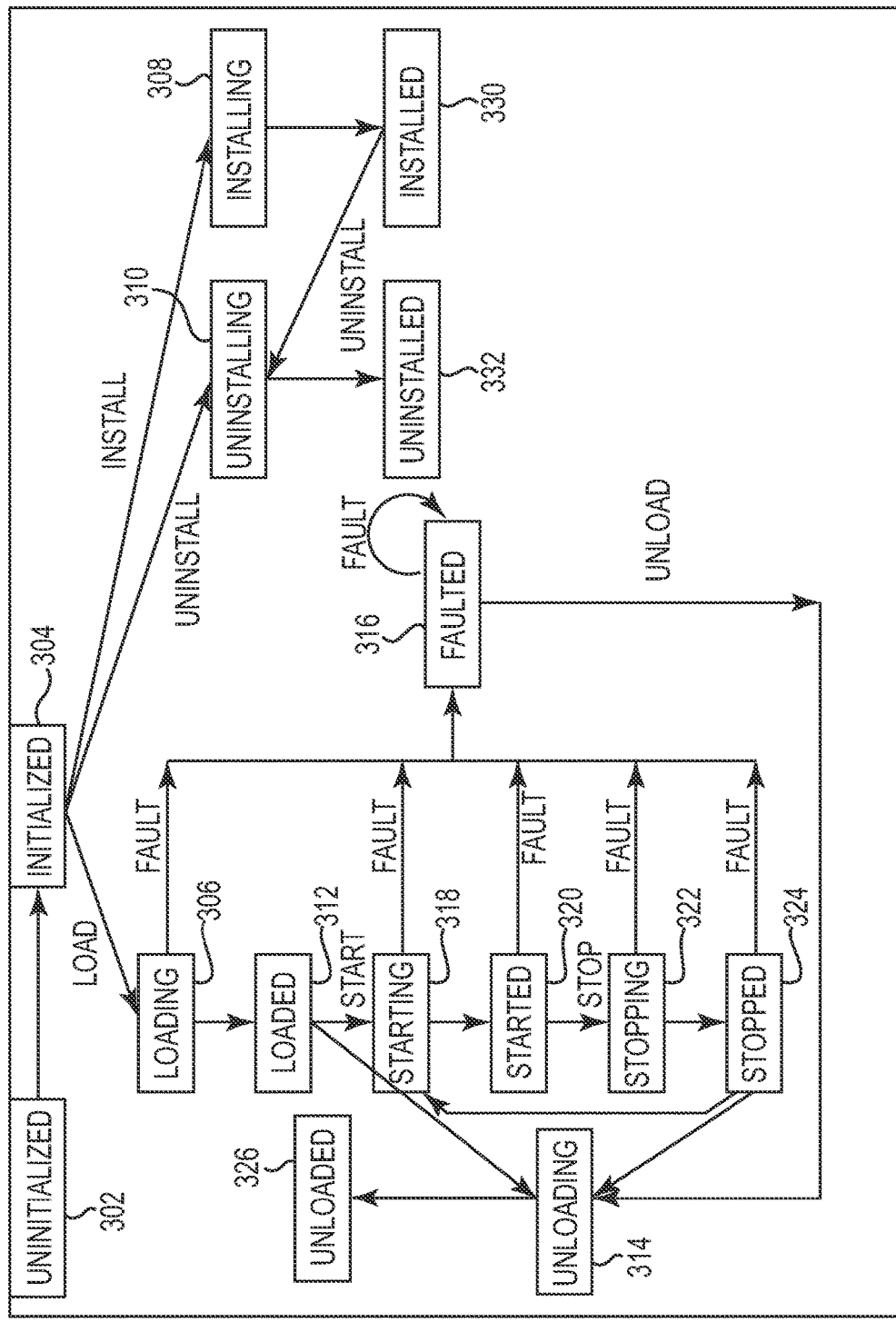
FIG. 3 is a block diagram illustrating a state machine for a module of the example distributed application of FIG. 2.

The distributed component model provides a formal module execution and deployment lifecycle. FIG. 3 illustrates a state machine 300 for the module lifecycle. State changes are triggered in the environment or some other event in the system. The module performs an appropriate action when a state change occurs. The following Table I describes the module states with reference to the elements of the state machine 300, and describes an event or trigger that takes a start state to a target state.

TABLE I

| Source State | Trigger/Event | Target State |
| --- | --- | --- |
| Uninitialized 302 | All component definitions loaded | Initialized 304 |
| Initialized 304 | Request to load component runtime objects for composition | Loading 306 |

TABLE I-continued

| Source State | Trigger/Event | Target State |
|---|---|---|
| Initialized 304 | Deploy is called on module | Installing 308 |
| Initialized 304 | Un-deploy is called on module | Uninstalling 310 |
| Loading 306 | Runtime components created and components ready for composition | Loaded 312 |
| Loading 306 | Request to unload module | Unloading 314 |
| Loading 306 | Exception during load | Faulted 316 |
| Loaded 312 | Start signal from host to module to start components | Starting 318 |
| Loaded 312 | Host calls Unload on module | Unloading 314 |
| Starting 318 | All components successfully started | Started 320 |
| Starting 318 | Exception during startup sequence | Faulted 316 |
| Started 320 | Hosting environment calls stop on module | Stopping 322 |
| Started 320 | Exception thrown after module has started | Faulted 316 |
| Stopping 322 | All components stopped successfully | Stopped 324 |
| Stopping 322 | Exception thrown during stopping the module | Faulted 316 |
| Stopped 324 | Hosting environment triggers start | Starting 318 |
| Stopped 323 | Hosting environment triggers unload of module | Unloading 314 |
| Faulted 316 | Faulted component faults again | Faulted 316 |
| Faulted 316 | Hosting environment triggers stop when module is in faulted state | Stopping 322 |
| Faulted 316 | Hosting environment called unload while the module is in faulted state | Unloading 314 |
| Unloading 314 | All components in the module were unloaded successfully. | Unloaded 326 |
| Installing 308 | Module successfully installed | Installed 330 |
| Installed 330 | Host triggers uninstall of the module | Uninstalling 310 |
| Uninstalling 310 | Module successfully uninstalled | Uninstalled 332 |

In one example, each module is a tier-specific unit of hosting. Each module 206a-206n can have an associate role such as a worker in a worker module or web in a web module. Several types of modules can exist in the distributed component model, and the module types correspond to the capabilities of the hosting environment. Such module types can include stateless, Web, stateful, browser, and storage. A stateless module can include stateless components on modules capable of hosting stateless components, such as worker role or an application fabric role. The Web module is hosted on web hosts. A stateful module includes stateless components and can be hosted in a fabric-aware host. The browser module can be hosted in a Web browser. The storage module can be hosted on storage servers such as, for example, SQL (structured query language) database servers.

The modules 204a-204n can also include cross-cutting aspects, which include aspects and filters to lift cross cutting concerns such as logging, throttling, and metering, and the like out of the application logic. In the distributed component model, the module 204a can have zero or more cross cutting aspects associated with it. In one example, the cross cutting aspects reflect the core Aspect Oriented Programming (AOP) idioms. For example, each aspect can include zero to n advices, policy metadata, and a jointpoint for which it is being invoked. Also, each advice can include zero to n pointcuts and zero to n subscribers. The pointcut is a predicate, i.e., a LINQ expression, evaluated at a jointpoint. (Language Integrated Query (LINQ) is a trade designation for a data query component available from Microsoft, Inc., in the Microsoft .NET Framework that adds native data querying capabilities to .NET languages, such as C-sharp (C#)). Upon pointcut evaluation, all Before, After, and Around advices are invoked.

A component, such as component 206a, in the distributed component model is a unit of technology encapsulation, extensibility, composition, and reuse. (Components 206a-206n are distinguishable from a common language runtime object/type or with components in other technologies like component object model or distributed component object model, i.e., "COM/DCOM.") The component 206a encapsulates a certain technology. Such technologies can include, for example, web application technologies or application programming interfaces for building connected, service-oriented applications. More than one component type can be developed for a given technology. For example, the application 202 could include a web application component and a service component in the web tier, a code component, a cache component, and a workflow component in the worker tier, and various storage components (such as tables or queues) and an SQL database component in the storage tier. In one example, the component 206a is a wrapper around a set of functionality. This wrapper hides the implementation details of the component yet exposes the functionality and dependencies that can allow loose coupling between service provider and consumers.

Figure 4:
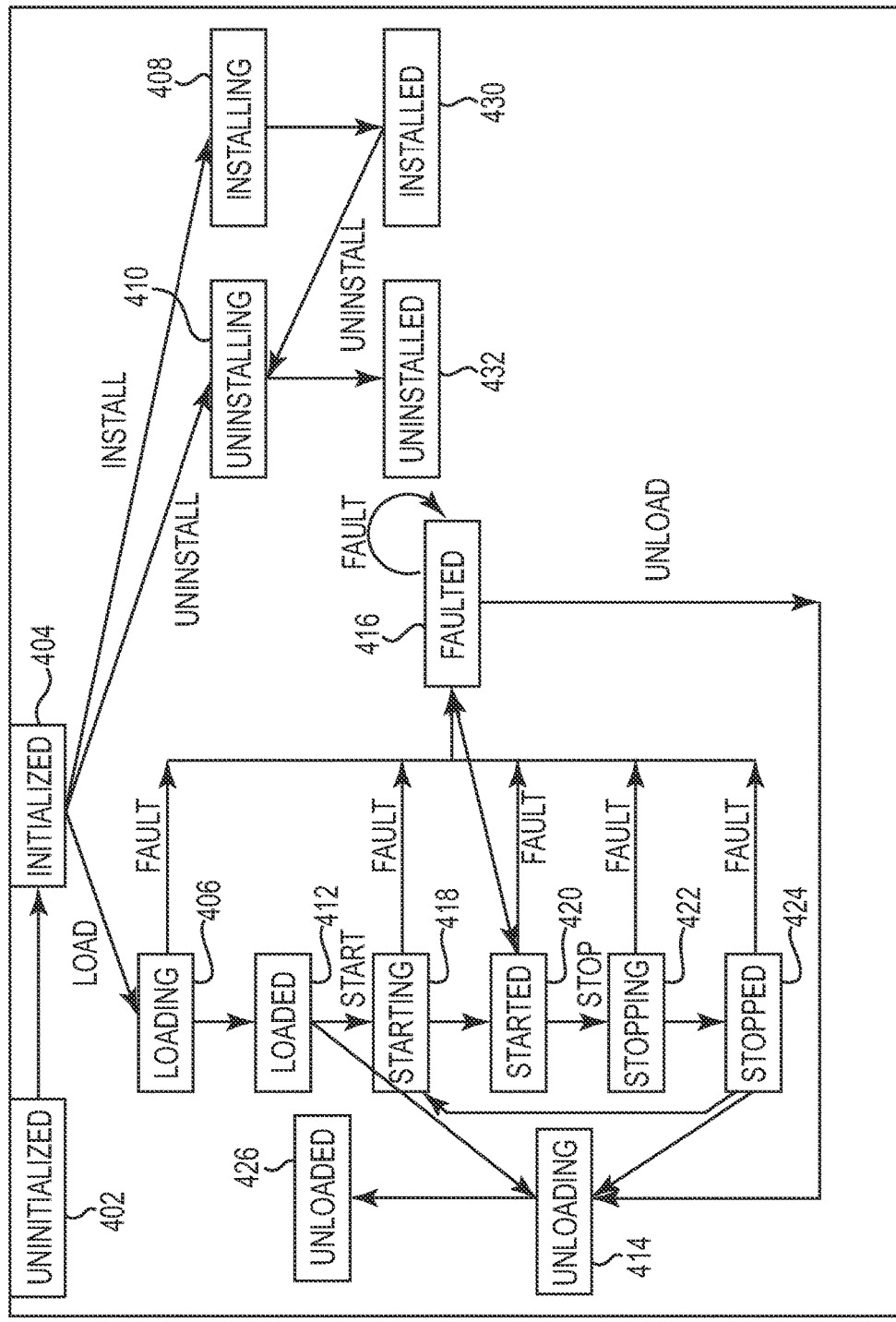
FIG. 4 is a block diagram illustrating a state machine for a component of the example distributed application of FIG. 2.

The distributed component model provides a formal component execution and deployment lifecycle. FIG. 4 illustrates a state machine 400 for the component lifecycle. State changes are triggered in the environment or some other event in the system. The component performs an appropriate action when a state change occurs. The following Table II describes the component states with reference to the elements of the state machine 400, and describes an event or trigger that takes a start state to a target state.

TABLE II

| Start State | Trigger/Event | Target State |
|---|---|---|
| Uninitialized 402 | This is the initial state of the Component. | Initialized 404 |
| Initialized 404 | Request to load component runtime | Loading 406 |
| Initialized 404 | Host triggers deployment of the component | Installing 408 |
| Initialized 404 | Host triggers un-deployment of the component | Uninstalling 410 |
| Loading 406 | Runtime component created and component ready for composition | Loaded 412 |
| Loading 406 | Request to unload component | Unloading 414 |
| Loading 406 | Exception during load | Faulted 416 |
| Loaded 412 | Component start triggered | Starting 418 |
| Loaded 412 | Host triggers unload | Unloading 414 |
| Starting 418 | Component successfully started | Started 420 |
| Starting 418 | Exception during startup sequence | Faulted 416 |
| Started 420 | Hosting environment calls stop on component | Stopping 422 |

TABLE II-continued

| Start State | Trigger/Event | Target State |
| --- | --- | --- |
| Started 420 | Exception thrown after component has started | Faulted 416 |
| Stopping 422 | Component stopped successfully | Stopped 424 |
| Stopping 422 | Exception thrown during stopping the component | Faulted 416 |
| Stopped 424 | Hosting environment triggers start | Starting 418 |
| Stopped 424 | Hosting environment triggers unload of component | Unloading 414 |
| Faulted 416 | Faulted component faults again | Faulted 416 |
| Faulted 416 | Component started after faulting by the hosting environment | Started 420 |
| Faulted 416 | Hosting environment triggers stop when component is in faulted state | Stopping 422 |
| Faulted 416 | Hosting environment called unload while the component is in faulted state | Unloading 414 |
| Unloading 414 | Component was successfully unloaded. | Unloaded 426 |
| Installing 408 | Component was successfully deployed | Installed 430 |
| Installed 430 | Hosting environment triggers uninstall of the component | Uninstalling 410 |
| Uninstalling 410 | Component was successfully uninstalled | Uninstalled 432 |

The components 206a-206n can include artifacts and define the metadata at runtime. In one example, a component metadata can include a security configuration. A component artifact can include configuration files, binaries, user code, and the like. Component metadata and artifacts can be captured in the application manifest and are made available to the component at runtime.

Components 206a-206n can export, i.e., offer, a set of capabilities and can import, i.e., use, a set of capabilities. A component can export a capability or a service that can be consumed by other components. Also, a component can import a capability or a service for consumption from another component 206n in the application 202 or from an external service. Thus, component exports imports and component imports are the mechanisms by which the components 206a-206n are stitched together to form the application 202. Stitching may be described at the design stage or can be dynamic in that available exports can be discovered, imported, and used at runtime. In either case, the stitching is a logical expression of a component relationship. The procurement of proxies and the resolution of physical addresses to get two component instances communicating are brokered at runtime.

The component export is a declarative specification of a capability offered at runtime. The component export can also represent an external piece of the application that is not part of the application being modeled. For example, an export can represent a message queuing technology such as one offered under the trade designation of MSMQ available from Microsoft, Inc. or a web service such as one offered under the trade designation of Amazon Web Services (AWS) available from Amazon com of Seattle, Wash. U.S.A. The component export also includes runtime logic to manufacture proxies that component imports can use. Component exports can be made visible at different scopes such as within the application or externally. Similar to components 206a-206n, component exports are associated with metadata and artifacts. Within the application 202, an export can be identified by a contract and a logical address. The shape and semantics of the contract can be related to the technology used and is opaque to the distributed component model. In one example, component exports are reusable, and independent software vendors can provide the components exports as a library. The component export includes metadata regarding cardinality, which specifies the number of imports acceptable to the component: none, one, or more than one.

A component import is also a declarative specification of a capability consumed by an instance of the component 204a. Component imports are satisfied by component exports that match the criteria of the component import, and the matching criteria is expressed as a declarative predicate on the component import. The predicate is evaluated to match/select from a set of available component exports visible scope of the component requesting the import. In one example, the component 206a will determine a match based on the name of the predicate, but the component can also determine a match on import/export metadata specified by an author of the component 206a or the application 202. The component import typically includes metadata regarding to cardinality, which specifies the number of exports acceptable to the component 206a: none, one, or more than one.

The distributed component model provides a mechanism for declaratively describing and constructing the distributed application 202 in an application definition. The application definition describes a form of a type system that captures the components 206a-206n within the application 202, the producer-consumer relationships between the components 206a-206n, and any external components or services consumed by components 206a-206n in the application 202. The application definition describes the configuration and constraints of the components as well as component dependencies, interrelationships, and interactions of the distributed application in a declarative manner. The application definition also provides the ability to schematize and extend the compositional structure and metadata in a format/representation agonistic manner. It can be use to validate the compositional structure of the distributed application 202 as well as enforce the composition structure at runtime. Such a representation of compositional structure of an application having complex interactions among a set of distributed components provides the ability to reason over an application lifecycle and can be used to scale the distributed application 202 in a distributed environment.

Figure 5:
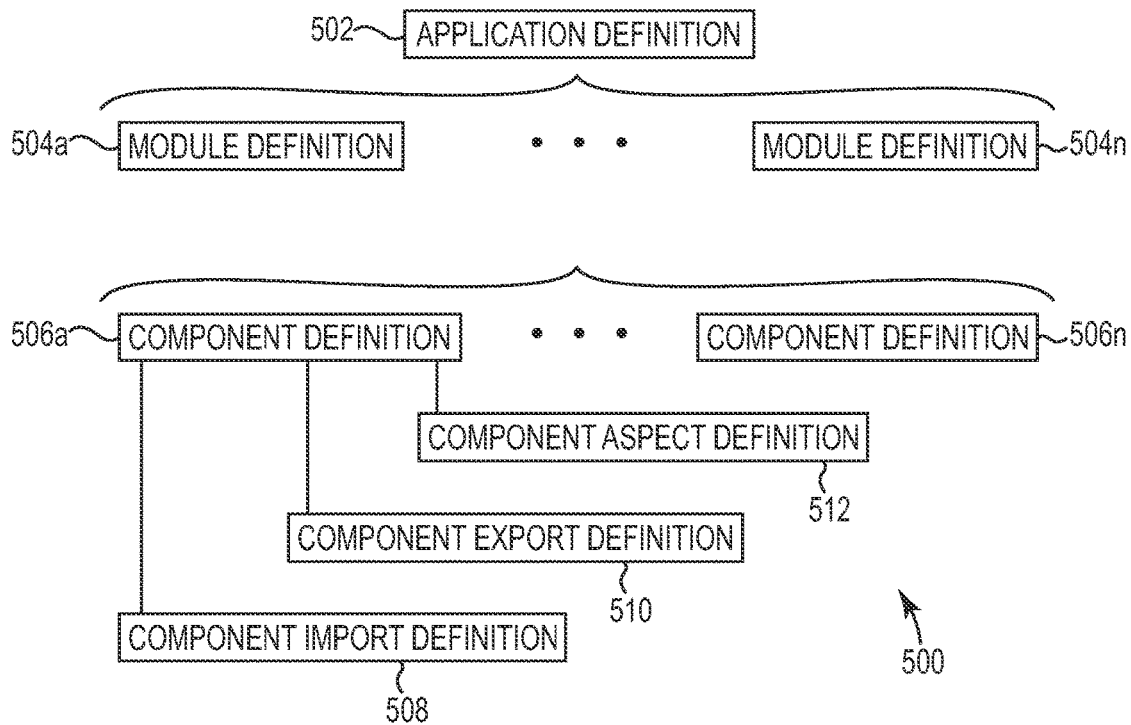
FIG. 5 is a block diagram illustrating an application definition of the distributed application of FIG. 2.

FIG. 5 illustrates an example application definition 500. The application definition 500 includes the constructs of an application definition 502, one or more module definitions 504a-504n, and one or more component definitions 506a-506n for each module definition 504a. The arrangement of the definition constructs resembles an ontology similar to the distributed application schema 200 as a definition tree. The root of the definition tree is the application definition 502. Each of the module definitions 504a-504n corresponds with a particular module of the module 204a-204n. Each component definition 506a-506n corresponds to one of the components of components 206a-206n. Additional constructs are included in the definition tree depending on the particular features of the components. For example, each component using an import includes a component import definition 508, and each component offering an export includes a component export definition 510. Each component that provides an aspect, such as a cross-cutting concern, includes a component aspect definition 512.

The definition constructs include a declarative description of the corresponding application, module, and component. Each definition construct includes associated metadata that further describes the construct. In one example, the component definitions 506a-506n for the application each include a common set of metadata that describe aspects of the corresponding component. Similarly, the module definitions 504a-504n for the application each include a common set of metadata that describe aspects of the corresponding module. The component import definitions 508, the component export definitions 510, and the component aspect definitions 512 can each include common sets of metadata. In addition to the common set of metadata, each component definition can specify component-specific metadata, which is also true for module, component export, component import, and component aspect definitions. In one example, the component-specific metadata is opaque to the distributed component model and is understood by the component 206a and other components that consume it. The application definition 500 in the distributed component model is validated to enforce component interrelationship and metadata. Each definition construct can also specify custom validation logic against the application definition.

Figure 6:
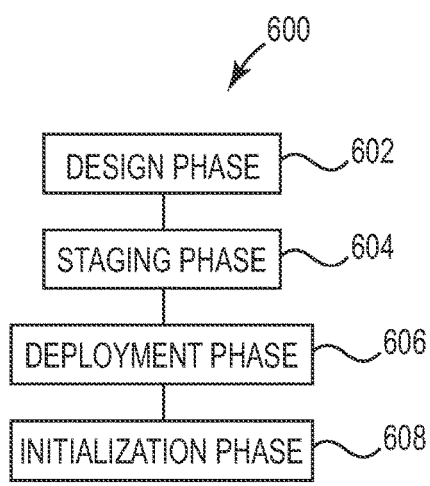
FIG. 6 is a block diagram illustrating an example application lifecycle of the distributed application of FIG. 2.

FIG. 6 illustrates how the application definition 500 is created and is used through an application lifecycle 600. The distributed application 202 is constructed during the application design phase at 602. The distributed application 202 is constructed as per the schema 200 prescribed by the distributed component model. The output of the design phase 602 is a serialized application package that contains the application manifest and the artifacts that make up the different components 206a-206n. The application package is staged in an application fabric repository during an application staging phase at 604. The application package is posted to an end point on which an application farm fabric manager is listening. Once the distributed application 202 is posted, the application fabric farm manager shreds the application package. The application farm manager will access the artifacts for each component 206a-206n according to the application manifest and stores them in the application fabric repository. The application farm manager will also expose the application hierarchy as a Representative State Transfer (REST) resource that can be accessed by other applications or by the component code themselves. The distributed application 202 stored in the application fabric repository is deployed to a host farm during the deployment phase at 606. In order to deploy the distributed application 202 to the host farm, the farm manager will look at the application manifest and deploy the appropriate modules 204a-204n within the application to a corresponding set of nodes within the host farm. During an application initialization phase at 608, the various different modules 204a-204n deployed to the nodes are loaded into the host process and the components 206a-206n within the modules 204a-204n start executing. If the component is a service, the component will create the end point and start listening on the end point.

The distributed component model provides developers and enterprises the ability to cost-effectively build, run, and evolve the distributed application 202. Both stateful and stateless components can be developed using familiar technologies, emerging technologies, and custom paradigms for specific domains. The components 206a-206n can be stitched together either statically or dynamically to form the application 202. Cloning, replication, and partitioning are supported within the application 202, as is the ability to make architectural tradeoffs such as among consistency, availability, and tolerance of "partitions" (such as describe in Brewster's CAP Conjecture).

The distributed component model provides for scalable applications to include the techniques of cloning, replication, and partitioning. Different techniques may apply to different parts of the application 202, which may change over time as the application grows. For example, cloning is a relatively straightforward technique, but in certain technologies it is exclusively suited for stateless components. Replication is currently an effective technique for stateful components, but it can be complex and limited. For example, the amount of state can grow during the life of the application 202 such as in the form of user sessions or cached data that are replicated across machines, or a row-locking scheme in a shared store that becomes the bottleneck to the performance of the application 202. In order to address the issue of growing state, a developer may choose to partition one or more components, which previously involved a costly and difficult re-architecture of the application 202.

In order to avoid a costly re-architecture, the application 202 is initially designed in a distributed component model to support partitioning, which can be used regardless of whether application growth is anticipated. Design patterns and use of a distributed composition runtime can make intra-component wiring immune to otherwise invasive changes such as sharding, which is typically know as horizontal partitioning of a database, and component partitioning. Partitioning is made available in the application 202 and then is activated as desired. The application 202 can be readily designed to map the partitions to machines as well. Additionally, the developer can retain flexibility about whether a component 206a or the entire application 202 runs on premise or in a cloud computing environment. As the costs of infrastructure change over time, the architecture of the application 202 can naturally evolve to take advantage of the relative cost changes.

Each module 204a can be a logical grouping of related components 206a-206n for the purposes of co-location and partitioning. Components 206a-206b grouped together within a module can run within the same application domain. For example, two or more components 206a-206n can be co-located if they abide by the same partitioning scheme. In a partitioned module, each part is independent of the others and hence receives its own application domain within which the set of co-partitioned components for the corresponding part will run. The components 206a-206n within a module, such as module 204a, can communicate via direct method invocations. Across modules 204a-204n, components communicate by sending messages. A module type can correspond to the capability of the host. For example, a stateless component, such as a web role, is hosted in a stateless module. Execution environments for modules include web and worker roles for stateless components and a fabric role for stateful components.

During runtime, the distributed application framework can monitor the application 202 to diagnose and repair issues as well as meter the use of the components 206a-206n. The distributed component model can elastically allocate and reclaim resources to support a fluctuating demand. Further, the distributed application framework provides for the ability to later partition the application 202, co-locate partitioned components 206a-206n, change a mapping of partitions to a physical infrastructure, and shard a database without costly re-architecture.

In one example, an application fabric available under the trade designation of AppFabric can run on premise, such as a server operating system available under the trade designation of Windows Server, and in a cloud environment having a cloud computing or cloud services operating system available under the trade designation Windows Azure, all available from Microsoft, Inc., allowing entire applications (or components within them) to be deployed to either environment or a combination the two. Web roles, workflow, and the like can be built using Windows Communication Foundation (WCF) and Windows Work Flow (WF) available from Microsoft, Inc.

In one example, a distributed application manifest provides the above-described distributed component model in definition constructs expressing the component configurations and their interrelationships to each other and interactions in a technology and format agnostic manner. The manifest is a serialized form of the application definition 500 and captures the entire structure of the application 202. In one example, the manifest is format agnostic and can be serialized in a variety of formats, which can include scripting languages such as extensible markup language (XML), extensible application markup language (XAML), JavaScript object notation (JSON), or binary JSON (BSON) and many others now know or yet to be created. The following example distributed application manifest is serialized in JSON:

```
{
"Name": "MyApp",
"Id": "622BN4TFQB3UHFEERJGFXPVX4A",
"BaseUri": http://MyApp.cloudapp.net/,
"SelfLink": " . . . ",
"Version": "1.0.0.100" ,
"References": [
    {"Type": "DistributedList", . . . }, {"Type":"TaskScheduler", . . .
},
     {"Type":"CloudQueue", . . . },
         {"Type": "WCFService", . . . } ],
"ModuleDefinitions":
[
    {"Name": "MyWebModule", Type" : "Web",
    "InstanceCountHint": 2, "Components": [ { . . . }] },
    {"Name": "MidTierModule", "Type" : "Stateful",
    "InstanceCountHint": 2,
    "IsolationLevel": "Process", "MachineSize": "Large",
    "PartitionPolicy": { "Type": "RangePartitionPolicy",
    "Keys": [ "A-G", "H-M","N-Z"] },
        "ReplicaCountHint": 2, "ReplicationFormat": "JSON",
        "WriteQuorum": 1,
        "Components":
    [
        {"Name": "MovieProcessor",
        "ModuleAffinity": "Stateful", . . .
            "Imports":
            [
            {"Name": "DistributedList", "Cardinality":
            "ExactlyOne", "InstancingPolicy":
                "Pooled", "Constraint": { . . . } } },
            {"Name": "NewMovies","Cardinality": "Atleast-
One",
            "InstancingPolicy":
                "Singleton","Constraint": { . . . } } },
            {"Name": "MovieService","Cardinality":
            "AtleastOne","InstancingPolicy":
                "Singleton","Constraint": { . . . } } },
            {"Name": "TaskScheduler","Cardinality":
            "AtleastOne","InstancingPolicy":
                "Singleton","Constraint": { . . . } } },
```

-continued

```
        ],
    }
    ]
 }
. . .
]
. . .
}
```

The manifest includes the application definition 502, the module definitions 504a-504n, component definitions 506a-506n, component exports 508, component imports 510, and component aspect definitions 512. In the example, the module definitions 504a-504n include metadata on instances, partitions, and replicas. A stateless module definition can include a declaratively defined instance count that control the number of module instances and describes the scalability and high availability (often referred to as "HA") characteristics of a stateless module and its corresponding components. A stateful module definition can include a declaratively defined instance count, a partition policy, and a replica count to describe the scalability and high availability characteristics of a stateful module and its corresponding components. In order to evolve or scale the application, a developer adjusts the counts and policies within the metadata of the module definition to a selected amount.

Figure 7:
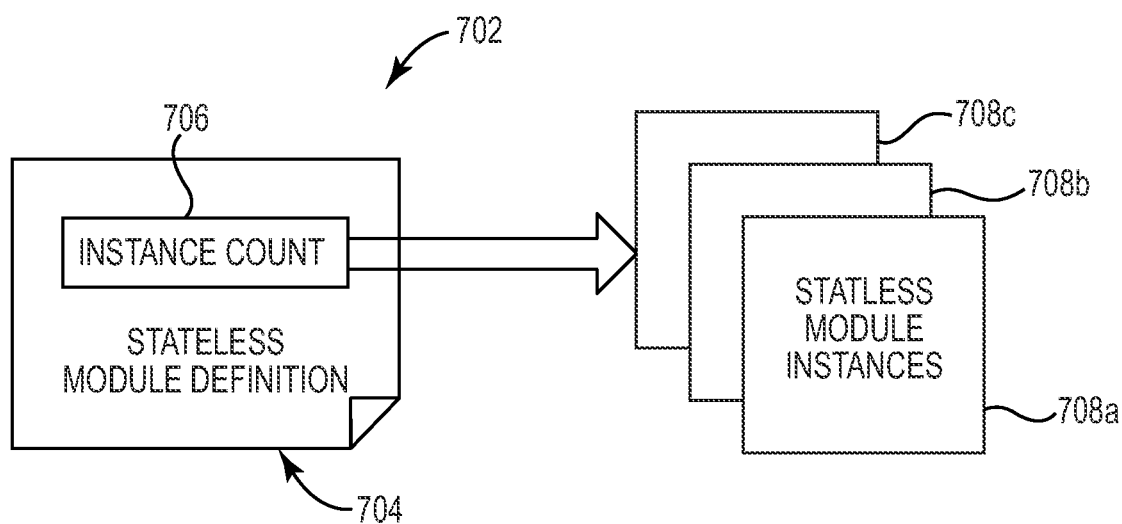
FIG. 7 is a block diagram illustrating scale out and high availability of a stateless module.

FIG. 7 illustrates scale out and high availability of a stateless module 702, which can correspond with module 304a for this example. The corresponding module definition 704 of the stateless module 702 includes an instance count 706 in the metadata. The instance count 706 controls the number of module instances, i.e., the scale out and high availability characteristics of the stateless module 702. The example module definition 704 includes an instance count 706 of 3, and thus 3 instances of the stateless module, i.e., instances 708a, 708b, 708c, are created at runtime. For example, the module definition 704 can include metadata regarding "Enable High Availability," which indicates if the module can be made highly available. Additionally, the module definition can include metadata regarding "Instance Count Hint," which specifies the number of instances of the stateless modules such as 708a to create at runtime.

Figure 8:
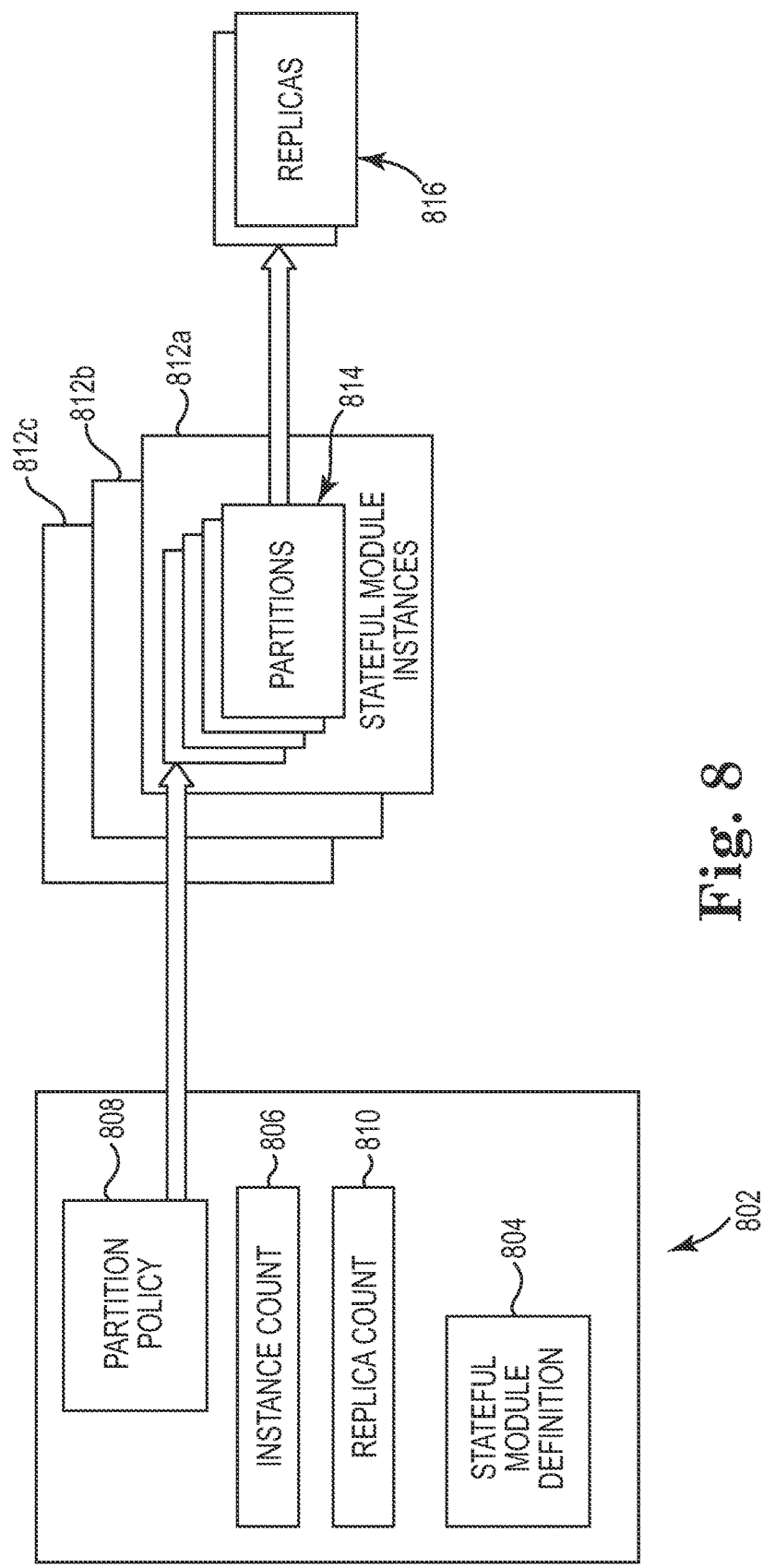
FIG. 8 is a block diagram illustrating scale out and high availability of a stateful module.

FIG. 8 illustrates scale out and high availability of a stateful module 802, which can correspond with module 304n for this example. The corresponding module definition 804 of the stateful module 802 includes an instance count 806, a partition policy 808, and a replica count 810 in the metadata. The instance count 806 controls the number of module instances and thus scale out. The partition policy 808 controls the number of partitions assigned to a given module instance. The replica count 810 controls the high availability and determines the number of replicas 816 to each partition. The example module definition 804 includes an instance count 806 of 3, i.e., instances 812a, 812b, 812c. The example partition policy 808 assigns 4 partitions 814 to each instance 812a, 812b, 812c, and the example replica count assigns 2 replicas 816 to each partition. The instances 812a, 812b, 812c, partitions 814, and replicas 816 are created at runtime.

Figure 9:
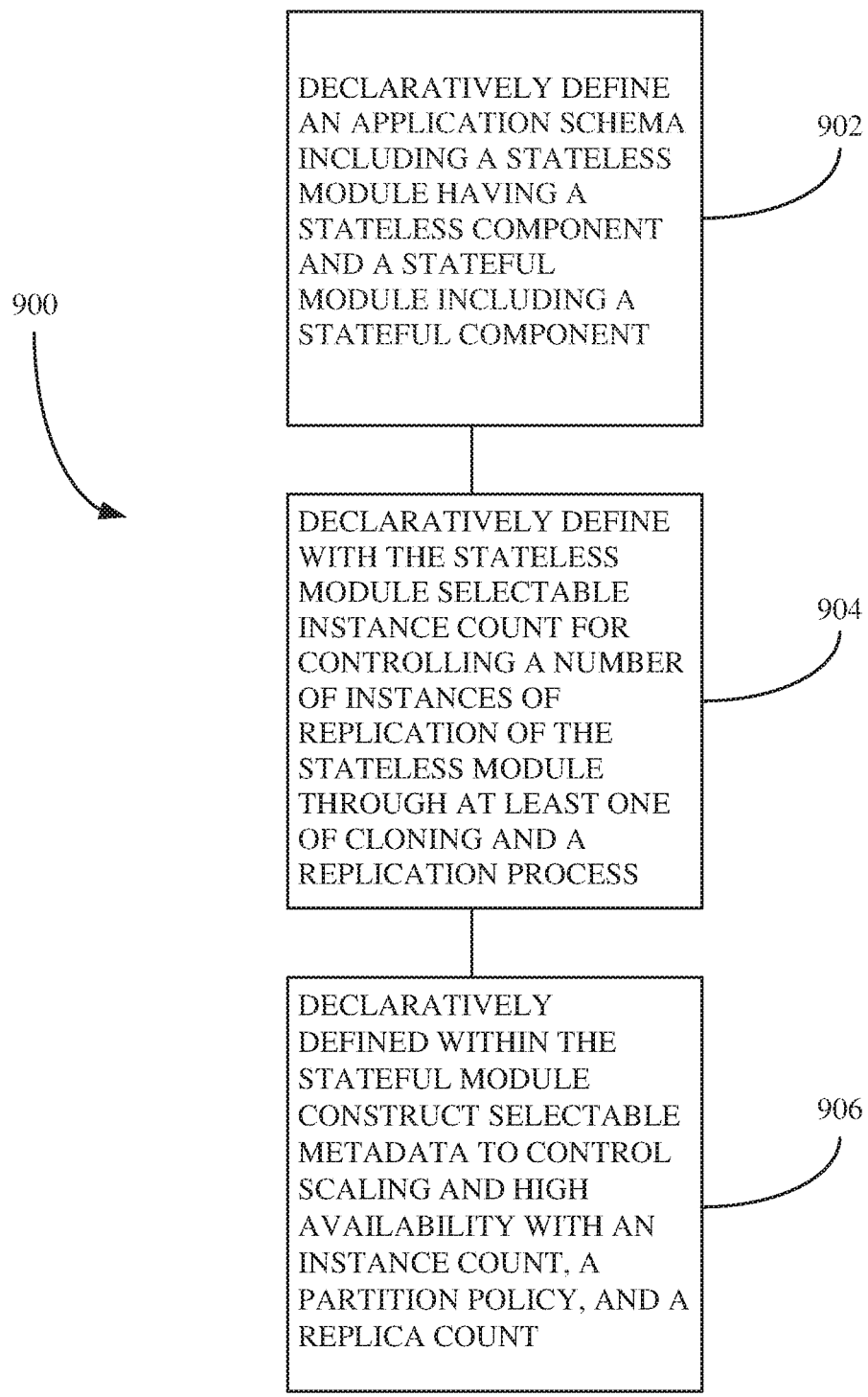
FIG. 9 is a block diagram illustrating a method of creating the distributed application of FIG. 2.

FIG. 9 illustrates an example method 900 of creating a distributed application in a distributed component model. An application schema including a stateless module having a stateless component and a stateful module including a stateful component is declaratively defined at 902. The application schema corresponds with a technology agnostic application definition having a stateless module construct corresponding with the stateless module and a stateful module construct corresponding with the stateful module. A selectable instance count for controlling a number of instances of replication of the stateless module through at least one of cloning and a replication process is declaratively defined with the stateless module at 904. Selectable metadata to control scaling and high availability with an instance count, a partition policy, and a replica count is declaratively defined within the stateful module construct at 906.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of creating a distributed application in a distributed component model, comprising:
    declaratively defining an application schema of the distributed application including a module having a component, the module is a tier-specific unit of hosting and the schema includes a corresponding definition construct expressing configurations in a serialized form of the application;
    declaratively defining within the module of the corresponding definition construct by adjustably programmable counts and policies within metadata to control scaling and availability of the distributed application in the serialized form of the application; and
    validate component interrelationships and enforce a compositional structure of the distributed application during runtime.

2. The method of claim 1 wherein the application schema includes a plurality of modules, and each module includes a plurality of components.

3. The method of claim 2 wherein the definition construct includes a plurality of module definitions corresponding to the plurality of modules and each module definition includes a plurality of component definitions corresponding to the plurality of components.

4. The method of claim 3 wherein the plurality of modules include a stateless module having a stateless component.

5. The method of claim 4 wherein the stateless component is replicated through cloning.

6. The method of claim 4 wherein the stateless modules correspond with module definitions having selectable metadata regarding instance count to specify the number of instances of the stateless module to create at runtime.

7. The method of claim 4 wherein the plurality of modules include a stateful module having a stateful component.

8. The method of claim 7 wherein the stateful module includes a corresponding stateful module definition having selectable metadata including an instance count, a partition policy, and a replica count.

9. The method of claim 8 wherein the instance count controls a number of module instances, the partition policy controls a number of partitions assigned to the module instances, and the replica count controls a number of replicas for each partition.

10. The method of claim 1 and further comprising serializing the application definition.

11. The method of claim 10 wherein the application definition is serialized from a scripting language.

12. The method of claim 1 and further comprising including the application definition within an application manifest.

13. The method of claim 1 wherein the application definition is used through an application lifecycle.

14. The method of claim 1 wherein the application constructs further include a component export definition, a component import definition and a component aspect definition corresponding with the component.

15. A computer readable storage medium storing computer executable instructions for controlling a computing device to perform a method comprising:
    creating a distributed application in a distributed component model, comprising:
        declaratively defining an application schema of the distributed application including an application definition construct having a plurality of modules each having a component, wherein each of the plurality of modules includes a corresponding module definition construct and a module of the plurality of modules includes cross cutting aspects to lift cross cutting capabilities from application logic of the distributed application; and
        declaratively defining within each of the corresponding module definition adjustable counts and policies within metadata to control scaling and high availability of the distributed application, the counts and policies being adjustable via programming modifications to the metadata in a serialized from of the application;
        the application definition construct validating and enforcing a compositional structure of the distributed application during runtime;
    providing tenant-aware cross cutting capabilities to the components at runtime.

16. The computer readable storage medium of claim 15 and further comprising serializing the application definition.

17. The computer readable storage medium of claim 15 and further including applying the application definition to validate a compositional structure of the distributed application.

18. The computer readable storage medium of claim 17 and further including applying the application definition to enforce the compositional structure at runtime.

19. A system for creating a distributed application in a distributed component model, the system comprising:
    a processor; and
    memory comprising instructions executable by the processor to:
    declaratively define an application schema of the distributed application including a plurality of modules having a component, the modules are a tier-specific unit of hosting and the components are a unit of technology encapsulation having a configuration expressed in a serialized form of the application, the distributed application including a stateless module having a stateless component and a stateful module including a stateful component;
    the application schema corresponding with a technology agnostic application definition having a stateless module construct and a stateful module construct, the stateless module construct corresponding with the stateless module and the stateful module construct corresponding with the stateful module;
    validate component interrelationships and enforce a compositional structure of the distributed application during runtime;

declaratively define within the stateless module an adjustable instance count for controlling a number of instances of replication of the stateless module of the distributed application through at least one of cloning and a replication process via programming modifications to metadata in the serialized form of the application; and declaratively define within the stateful module metadata to control scaling and high availability of the distributed application with an adjustable instance count, partition policy, and replica count via programming modifications to metadata in the serialized form of the application.

20. The system of claim 19 wherein the application definition is serialized into an application manifest.

* * * * *